(12) United States Patent
Fujita et al.

(10) Patent No.: US 9,467,709 B2
(45) Date of Patent: Oct. 11, 2016

(54) DATA DECODING DEVICE AND PROCESS OPERATING DEPENDING ON SELECTED MODES

(75) Inventors: Shigeru Fujita, Yokohama (JP); Hiroki Horikoshi, Komae (JP); Hiroyuki Hosogoshi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 723 days.

(21) Appl. No.: 13/439,687

(22) Filed: Apr. 4, 2012

(65) Prior Publication Data
US 2012/0257837 A1   Oct. 11, 2012

(30) Foreign Application Priority Data
Apr. 11, 2011   (JP) .................................. 2011-087151

(51) Int. Cl.
*G06K 9/36* (2006.01)
*H04N 19/44* (2014.01)
*H04N 19/597* (2014.01)

(52) U.S. Cl.
CPC ............ *H04N 19/44* (2014.11); *H04N 19/597* (2014.11)

(58) Field of Classification Search
CPC .................................. H04N 7/30; H04N 7/50
USPC ........... 341/67; 348/302; 358/1.15; 382/232, 382/234, 244, 245, 284; 712/216
See application file for complete search history.

(56) References Cited

U.S. PATENT DOCUMENTS

| | | | | |
|---|---|---|---|---|
| 5,345,316 A | * | 9/1994 | Ozaki et al. ................... | 382/234 |
| 5,541,595 A | * | 7/1996 | Meyer ............................. | 341/67 |
| 5,574,834 A | * | 11/1996 | Horie et al. ................... | 358/1.15 |
| 6,236,759 B1 | * | 5/2001 | Horie et al. ................... | 382/244 |
| 7,190,397 B2 | * | 3/2007 | Andersson ..................... | 348/302 |
| 7,433,541 B2 | * | 10/2008 | Fukuhara et al. ............. | 382/284 |
| 7,451,294 B2 | * | 11/2008 | Sperber et al. ............... | 712/216 |
| 7,860,323 B2 | * | 12/2010 | Kim ..................... | H04N 19/107 382/166 |
| 7,983,500 B2 | * | 7/2011 | Zeng et al. .................... | 382/245 |
| 8,275,208 B2 | * | 9/2012 | Moon et al. ................... | 382/232 |
| 8,351,719 B2 | * | 1/2013 | Horikoshi ...................... | 382/234 |
| 2009/0060357 A1 | | 3/2009 | Horikoshi ...................... | 382/233 |
| 2009/0297051 A1 | * | 12/2009 | Nonaka et al. ............... | 382/232 |
| 2013/0141474 A1 | * | 6/2013 | Kim .............................. | 345/690 |

FOREIGN PATENT DOCUMENTS

| | | | | |
|---|---|---|---|---|
| JP | H09-121286 | 5/1997 | ............... | G06T 9/00 |
| JP | 3083493 | 6/2000 | | |
| JP | 2007-214814 | 8/2007 | ............... | G06T 9/00 |

OTHER PUBLICATIONS

Ville Kyrki, "JBIG image compression standard," Mar. 1999.*
JP Office Action—Application No. 2012-068971 dated Apr. 12, 2016.

* cited by examiner

*Primary Examiner* — Vikkram Bali
*Assistant Examiner* — Xuemei Chen
(74) *Attorney, Agent, or Firm* — Fitzpatrick, Cella, Harper & Scinto (57) ABSTRACT

A data decoding device is provided that can decode, at high speed and with low cost, image data encoded at a high compression rate. Provided are an input unit to be input a first encoded data, a second encoded data, the second encoded data and reference data of the line image data; an acquisition unit to acquire, a first reference data to decode the first encoded data to the higher-end data and a second reference data to decode the second encoded data to the lower-end data; a decoding unit to decode the second encoded data to the lower-end data on the basis of the second reference data while the first encoded data is decoded to the higher-end data on the basis of the first reference data and; and a combining means to combine the higher-end data and the lower-end data that were decoded by the decoding unit.

15 Claims, 10 Drawing Sheets

DATA DECODING DEVICE AND PROCESS OPERATING DEPENDING ON SELECTED MODES

BACKGROUND OF THE INVENTION

1. Field of the Invention

The present invention relates to a data decoding device, specifically a data decoding device and that realize -high-speed decoding processing.

2. Description of the Related Art

As an image forming system for color printing, a configuration in which a host PC sends image data in which one pixel is represented by an RGB multi-value form is known. In order to reduce the amount of data transferred from the host PC to the image forming system, generally, encoded data obtained by compressing image data within the host PC is transferred to the image forming system, where the encoded data is decoded.

Recently, a higher picture-quality of an image has been required. In order to attain a higher picture-quality of an image, in some images, one pixel has a gradation of more than one byte per pixel. Data of these images is subjected to image compression in order to be transferred from the host PC to the image forming system. As one example of the image compression, there is a well known method in which the host PC separates image data of each pixel into higher-end image data and lower-end image data and compresses each of the higher-end image data and lower-end image data. This method may allow for a higher compression rate, compared with a case where image data is not separated into higher-end image data and lower-end image data. Therefore, the speed to transfer the data from the host PC to the image forming system becomes faster.

In the image forming system, decoding processing is performed to decode encoded data sent from the host PC; decoded multi-valued image data is subjected to color processing such as color space conversion; and the color-processed multi-valued data is subjected to pseudo gradation processing to be converted into binary data that can be outputted by a print head. In the case where image data processing such as decoding processing, color processing and pseudo gradation processing is realized within a system LSI that is central to the control of the whole system, sharing an external main memory connected to the system LSI can reduce cost.

That is because hardware resource such as circuit size and the number of pins of LSI can be reduced, for example, compared with a case where system LSI embedded memories, each being dedicated to decoding processing, color processing or pseudo gradation processing, are used and a case where a plurality of external memories connected to a system LSI are used.

However, in the case where an external main memory connected to a system LSI is shared, the bandwidth of the main memory may be a bottleneck, thereby degrading the processing performance of the image forming controller. Even if the operating frequency of the system LSI is improved by advancing the semiconductor process, it is important in performance to reduce the number of accesses to the main memory when increase of the bandwidth of the main memory does not catch up with the improvement.

In a method to refer to upper one raster in decoding processing, when one pixel is subjected to decoding processing, one read access to a reference pixel occurs. Accordingly, in processing for RGB three colors, three read accesses to a reference pixel occur in total. In image data having gradation data of more than 8 bits per pixel, more memory bandwidth is consumed for read access to a reference pixel, compared to image data having 8 bits per pixel.

A higher memory bandwidth required in decoding processing may degrade performance of decoding processing itself, as well as performance of other image processing carried out in the system LSI.

In order to reduce read accesses to reference pixel data in an external memory connected to a system LSI, Japanese Patent Publication No. 3083493, for example, discloses a configuration in which a buffer to storing reference rasters is provided within the system LSI.

Recently, a higher picture-quality of a print image, a speed-up of printing and a lower cost have been required for the image forming system. To achieve the speed-up, a high compression rate must be realized to reduce the amount of data transferred from the host PC to the image forming system. In data processing within the image forming system, accesses to the external memory connected to the system LSI need to be reduced.

In the art described in Japanese Patent Publication No. 3083493, an on-chip buffer provided within the system LSI can reduce read accesses to reference pixel data. However, this has a great influence on chip cost in a large-format printer that has been recently brought to the market. That is, in the case where an upper reference line is stored in the on-chip buffer in decoding processing, assuming that each of RGB is 16 bits, a memory capacity of the number of pixels on one line multiplied by 48 bits is required. For example, in the case where the resolution is 1200 dpi and the maximum printing width is 60 inches, an on-chip memory capacity of no less than 3.3 M bits is required.

In addition, if compressed image data is decoded with the use of reference data, in the above method that includes separating the data into higher-end bytes and lower-end bytes and compressing the separated data, reference data for decoding also must be separated into higher-end bytes and lower-end bytes. In such a case, when data is read from a RAM in such a way that the data is separated into the higher-end and the lower-end, reading at high speed is impossible. Meanwhile, when data can be read at high speed, the data cannot be separated into the higher-end and the lower-end, thus requiring a large amount of memory capacity.

SUMMARY OF THE INVENTION

The present invention has been made in view of the above points and has an objective to provide a data decoding device that can decode, at high speed and with low cost, image data encoded in a high compression rate.

The present invention for achieving the above objective is characterized in including: a data decoding device comprising: an input unit to be input a first encoded data, the first encoded data being obtained by combining a plurality of higher-end data of line image data and then encoded, a second encoded data, the second encoded data being obtained by combining a plurality of lower-end data of the line image data and then encoded, and reference data of the line image data; an acquisition unit to acquire, on the basis of the reference data, a first reference data to decode the first encoded data to the higher-end data and a second reference data to decode the second encoded data to the lower-end data; a decoding unit to decode the second encoded data to the lower-end data on the basis of the second reference data while the first encoded data is decoded to the higher-end data on the basis of the first reference data and; and a combining means to combine the higher-end data and the lower-end data that were decoded by the decoding unit.

In the above configuration, reference data that has not been separated into higher-end data and lower-end data yet is acquired from a RAM. As a result, image data encoded at a high compression rate can be decoded at high speed and with low cost.

Further features of the present invention will become apparent from the following description of exemplary embodiments (with reference to the attached drawings).

DESCRIPTION OF THE EMBODIMENTS

Hereinafter, embodiments according to the present invention will be described in detail with reference to drawings.
(First Embodiment)

Figure 1:
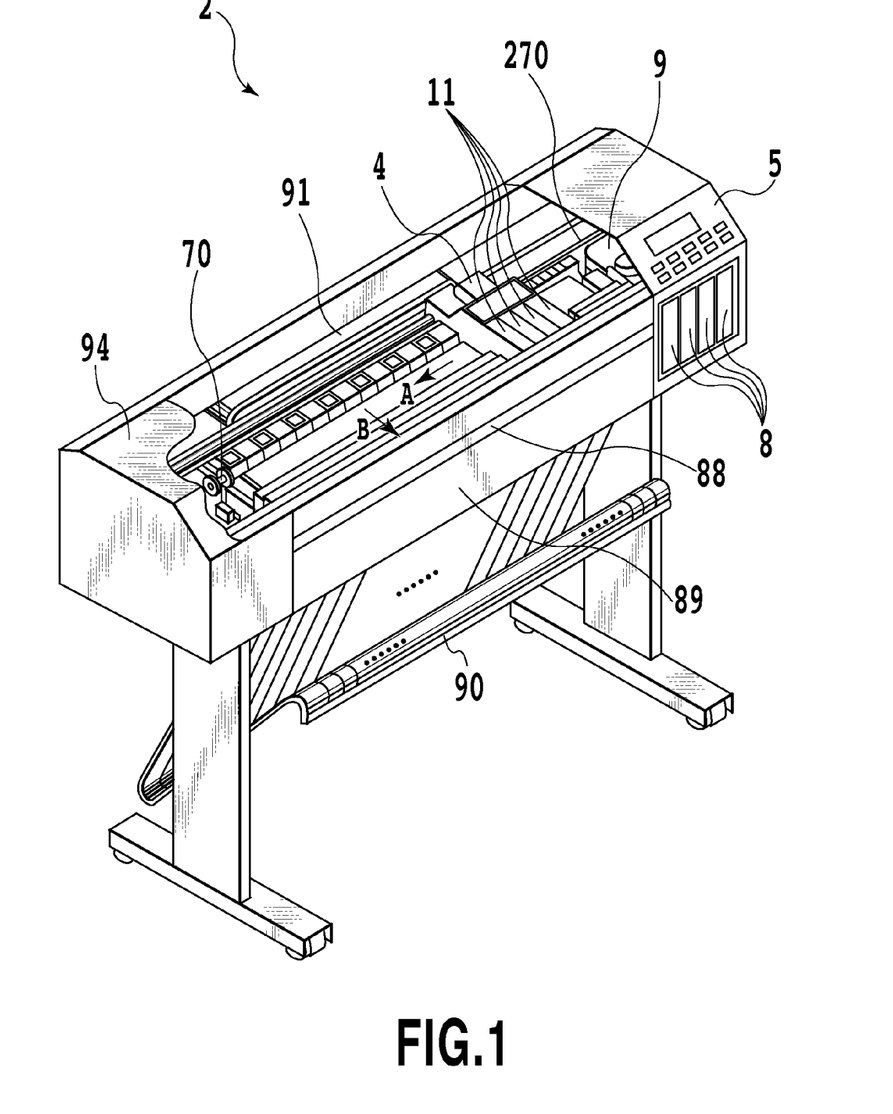
FIG. 1 is an external perspective view illustrating components of an inkjet printing apparatus according to a first embodiment.

FIG. 1 is an external perspective view illustrating components of an inkjet printing apparatus. A front face of a printing apparatus 2 is provided with a manual paper-feeding port 88, and under the manual paper-feeding port 88 a roll paper cassette 89 that can be opened and closed toward a front direction is disposed. A printing medium such as a printing paper is supplied through the manual paper-feeding port 88 or roll paper cassette 89 to the inside of the printing apparatus. The inkjet printing apparatus 2 includes a apparatus body 94 supported by two legs, a stacker 90 into which an discharged printing medium is loaded, and a transparent upper cover 91 through which the inside of the apparatus 2 can be seen and that can be opened and closed. An operation panel section 5 and an ink supply unit 8 are disposed on the right side of the apparatus body 94. On the reverse side of the operation panel section 5, a control unit is disposed. The printing apparatus 2 having such a configuration can print a poster-sized large image such as A0 and B0.

The printing apparatus 2 includes a conveying roller 70 to convey a printing medium in the direction of arrow B (vertical scanning direction) and a carriage unit (hereinafter also referred to as a carriage) 4 that is guided and supported so as to be able to reciprocate widthwise (direction of Arrow A, main scanning direction) of a printing medium. A driving force of a carriage motor (not illustrated) is transmitted through a carriage belt (hereinafter also referred to as a belt) 270 thereby to cause the carriage 4 to reciprocate in the direction of Arrow A. An inkjet print head (hereinafter also referred to as a print head) 11 is mounted on the carriage 4.

An ink ejection failure due to clogging of an ejection port of the print head 11 is overcome by a recovery unit 9.

In the printing apparatus according to the present embodiment, in order to perform color-printing on a printing medium, the print head 11, which is constituted by four heads that correspond to four color inks, is mounted on the carriage 4. The four print heads, each having 2048 nozzles, eject an ink droplet of 4 pl at each ejection. Nozzle arrays, each being constituted by 2048 nozzles, are arranged in order as nozzle arrays for ejecting black (K), cyan (C), magenta (M), yellow (Y) inks in the main scanning direction. The nozzle resolution of the print head 11 is 1200 dpi. For this configuration, the ink supply unit 8 includes four ink tanks, each containing K ink, C ink, M ink or Y ink.

When printing is performed on the printing medium according to the present embodiment, first, the conveying roller 70 conveys the printing medium to a predefined printing start position. After that, the operation that the carriage 4 makes the print head 11 scan in the main scanning direction and operation that the conveying roller 70 conveys the printing medium in the vertical scanning direction are repeated thereby to perform printing over the printing medium.

That is, the belt 270 and carriage motor cause the carriage 4 to move in the direction of the illustrated Arrow A, thereby performing printing on the printing medium. When the carriage 4 returns to a position prior to scanning (a home position), the conveying roller conveys the printing medium in the vertical scanning direction, and after that, the carriage is scanned in the direction of Arrow A again, thereby printing an image, characters or the like on the printing medium. By repeating the above operations, when printing on one sheet of the printing medium has been completed, the printing medium is discharged into the stacker 90 to complete printing of, for example, one sheet of A0-sized paper.

Figure 2:
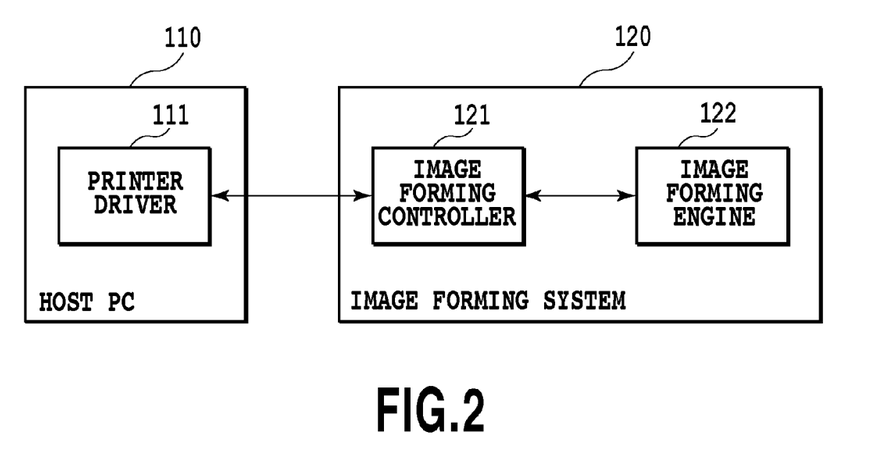
FIG. 2 is a block diagram illustrating an image forming system and a host PC according to the first embodiment.

FIG. 2 is a block diagram illustrating an image forming system and a host PC according to the present embodiment. A printing apparatus body 120 as an image forming system is connected to the host PC 110. The printing apparatus body 120 and the host PC are connected via a network (a wired LAN, a wireless LAN), a USB, IEEE1394 or the like. The image forming system 120 is composed of an image forming controller 121 and an image forming engine 122. The image forming controller 121 has an interface function with the host PC 110 and functions of interpreting print data sent from the host PC, decoding the compressed print data and performing image processing. Image processing converts the inputted image data to binary data which is then transferred to the image forming engine. The image forming engine 122 controls scanning of the print head, ink ejection and paper feeding for printing the binarized print data on the printing medium.

Figure 3:
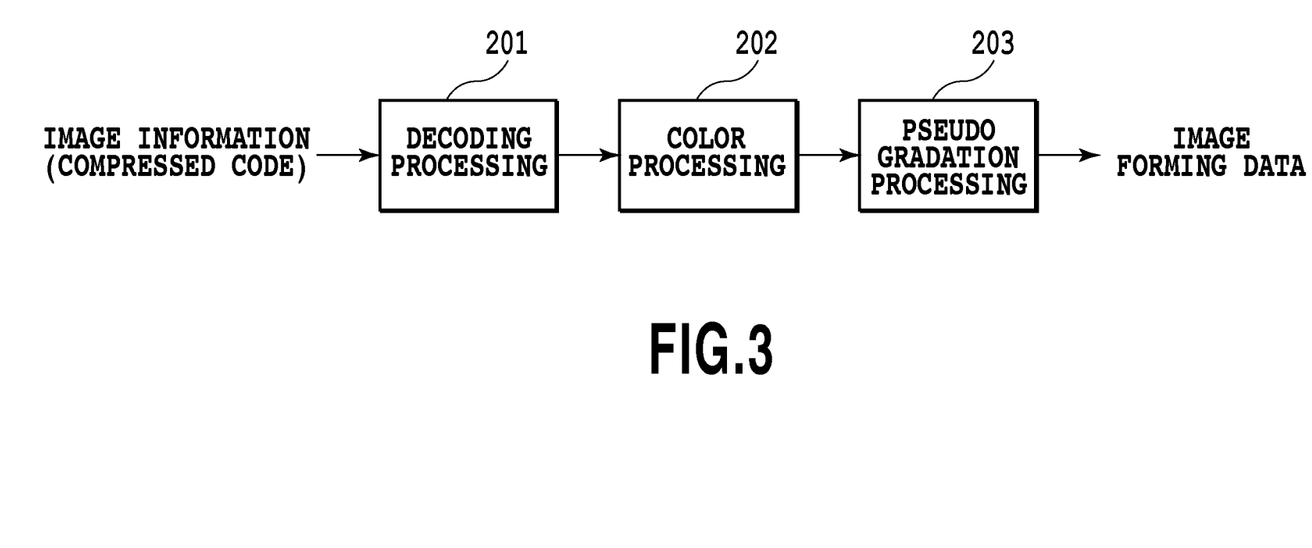
FIG. 3 is a diagram illustrating a basic data flow of an image forming controller.

FIG. 3 is a diagram illustrating a basic data flow of the image forming controller. Compression-coded data is inputted from the host PC, and is subjected to decoding processing 201 to be restored to RGB multivalued image data. The restored image data is subjected to color processing 202 such as gamma correction processing and color space conversion processing (CSC) thereby to be converted to ink-colored (for example, CMYK) multivalued data. Further, the multivalued data is subjected to pseudo gradation processing 203 using an error diffusion method or a dither method thereby to be converted to image forming data that is binary data per color. In this way, multivalued image data is converted to binary data that can be outputted in the image forming engine (print head).

Figure 4:
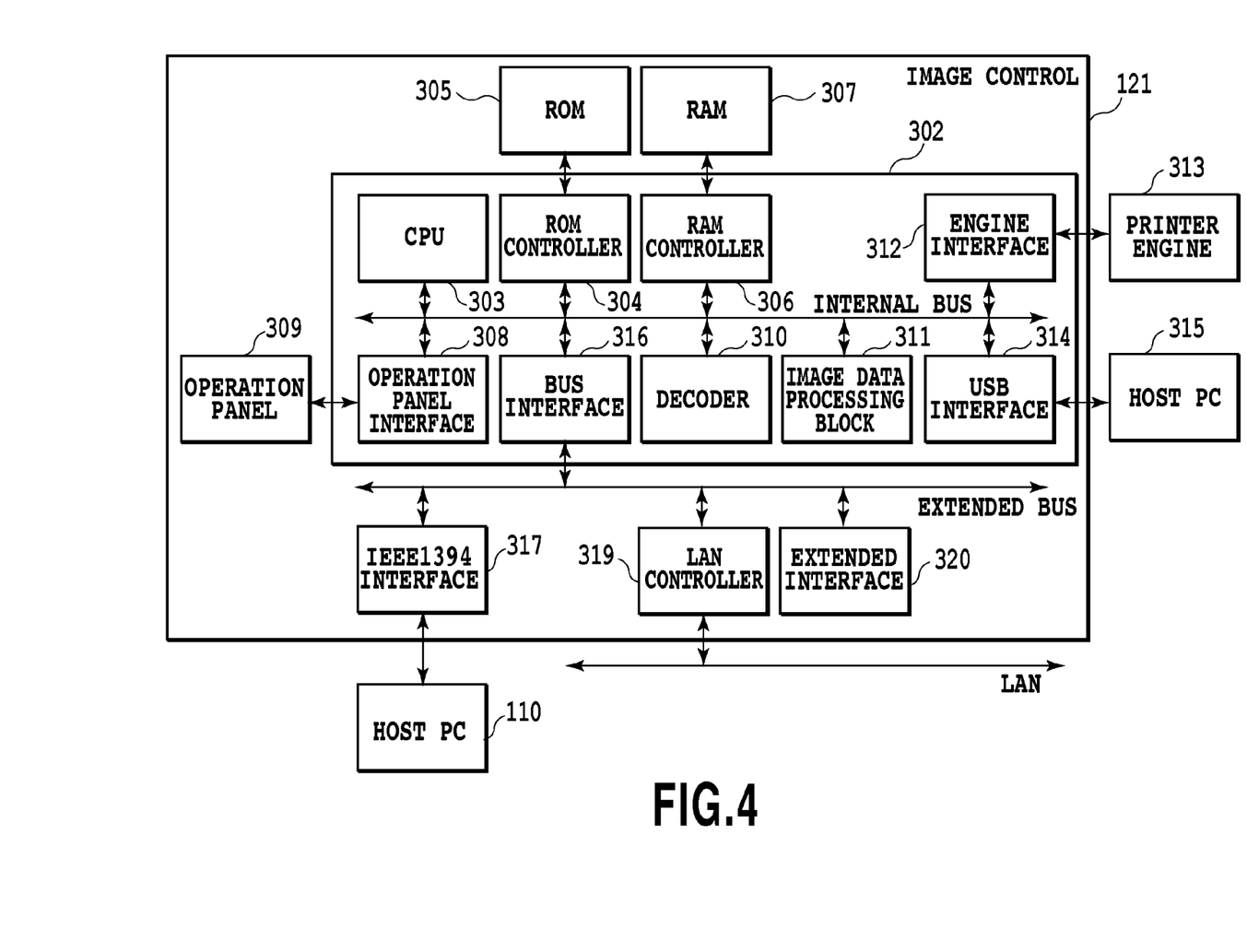
FIG. 4 is a schematic block diagram illustrating an image forming controller according to the first embodiment.

FIG. 4 is a schematic block diagram illustrating the image forming controller according to the present embodiment. The image forming controller 121 is connected via a USB interface 314 to a host PC 315. The image forming controller 121 is connected via an IEEE1394 interface 317 to the host PC 110. Further, the image forming controller 121 is connected through a LAN controller 319 to a plurality of host PCs. The image forming controller 121 is connected via an engine interface 312 to a printer engine 313.

The image forming controller 121 is comprised of a controller chip 302, a ROM 305, a RAM 307, an operation panel 309, an IEEE1394 interface 317, a LAN controller 319 and an extended interface 320. Between the controller chip 302 and the IEEE1394 interface 317, USB interface 314 and extended interface 320 are connected via an extended bus.

The controller chip 302 is a system LSI on which internal processing blocks are mounted, the internal processing blocks being comprised of a CPU 303, a ROM controller 304, a RAM controller 306, data decoding device (decoder) 310 and an image data processing block 311. Further, the controller chip 302 includes external interfaces, that is, an operation panel interface 308, a bus interface 316, the USB interface 314 and the engine interface 312, and each of the blocks is interconnected via an internal bus.

The CPU 303 operates according to a program stored in the ROM 305, and communicates with the host PC and printer engine and controls each section via various interfaces. The ROM controller 304 performs interface control with the ROM 305 connected thereto. The RAM controller 306 performs interface control with the RAM 307 connected thereto, and inputs data to and outputs data from the RAM 307 according to a request from the CPU 303 or other blocks while controlling RAM access timing.

The operation panel interface 308 performs interface control with the operation panel 309 on which an operation key, LED and LCD are mounted. The operation panel interface 308 communicates an operation key input from the user to the CPU 303, and an instruction from the CPU 303 controls LED and LCD displays. The bus interface 316 is a block to control the extended bus and performs communication control with each controller connected to the extended bus.

A decoder 310 reads, from the RAM 307 as a storage memory, compression-coded print data sent from the host PC, decodes the compression coded print data and writes this decoded data to the RAM 307. The decoder supports not only compression technology in which a horizontally adjacent pixel is referred to, but also technology in which a vertically adjacent pixel is referred to, and reads compressed codes and reference pixel data from the RAM 307 and performs decoding.

The image data processing block 311 reads data decoded by the decoder from the RAM 307, converts the data into dot data of each color and writes the dot data in the RAM 307.

The engine interface 312 controls reading dot data of each color from the RAM 307 and sending the data to the printer engine 313. The print data sent from the host PC is inputted via each of the interfaces of controllers. Print data inputted via the LAN controller passes through the extended bus and the bus interface 316 of the controller chip 302, and is written to the RAM 307 according to control of the RAM controller 306. The print data written to the RAM 307, after communication protocol thereof is interpreted by the CPU 303, is passed to and decoded in the decoder 310. The decoded print data is converted to dot data of each color in the image data processing block, and the dot data is sent via the engine interface 312 to the printer engine 313 thereby to be printed on a medium.

Figure 5:
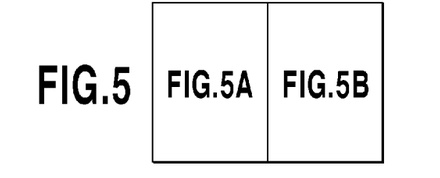
FIG. 5 is a diagram showing the relationship of FIGS. 5A and 5B.
Figure 5A:
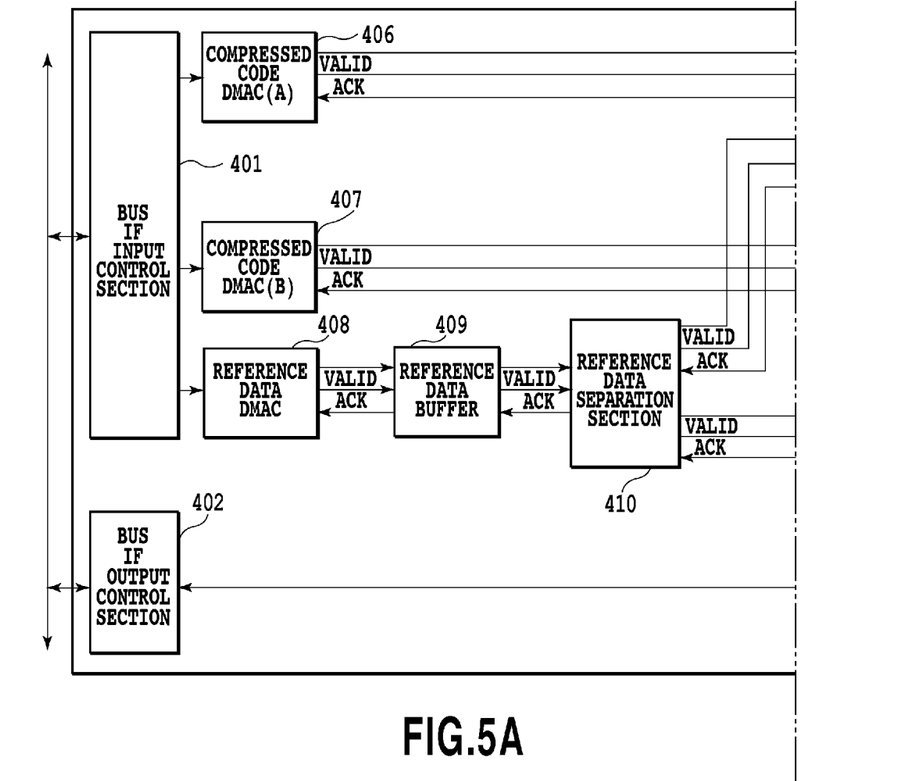
FIGS. 5A and 5B are schematic block diagrams illustrating a decoder according to the first embodiment.
Figure 5B:
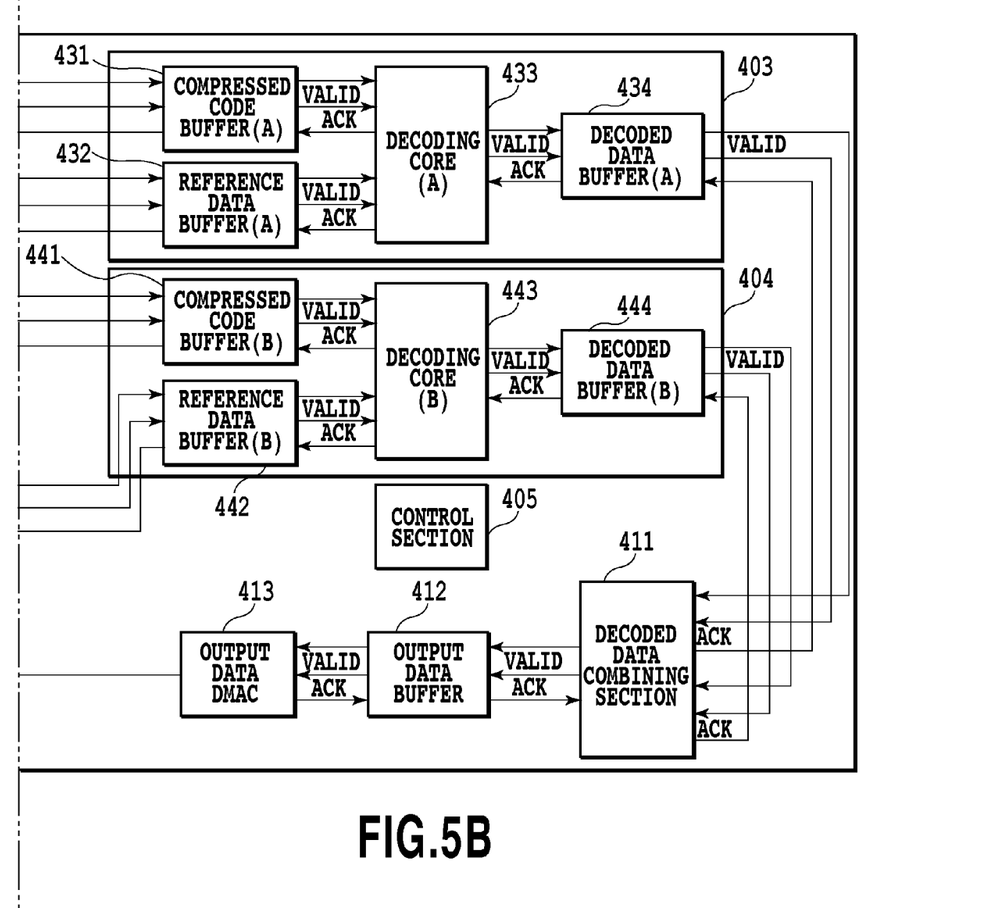

FIG. 5 is a schematic block diagram illustrating the decoder 310 illustrated in FIG. 4. The decoder in FIG. 5 decodes data that was encoded in the host PC 110. Data is reversibly compressed by encoding the data. The decoder, in particular, performs decoding processing on data that was encoded in an encoding method utilizing both horizontal and vertical continuity of pixels such as delta row encoding. The present invention is not limited to data obtained by an encoding method utilizing both the horizontal and vertical continuity of pixels, but may be data obtained by an encoding method utilizing only vertical continuity of pixels. For example, as a compression method utilizing only vertical continuity of pixels, a method may be used in which the difference between pixel data of a pixel to be compressed and pixel data of a pixel whose horizontal position is the same as that of the pixel to be compressed in a raster prior to the pixel to be compressed is obtained, it is determined if those pixel data are the same or not, and encoding is performed.

Figure 6:
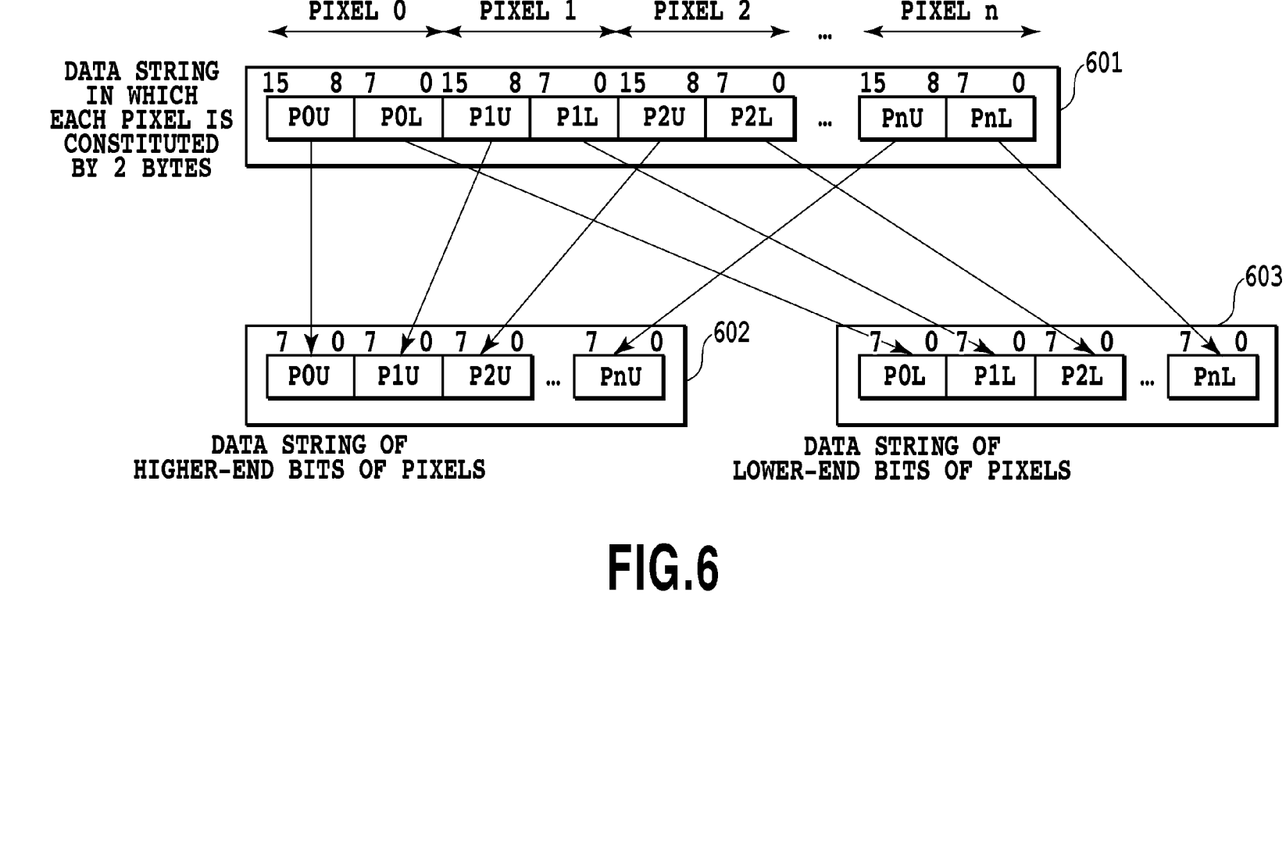
FIG. 6 is an example of separating image data into higher-end data and lower-end data.

FIG. 6 illustrates data generation performed by the host PC 110 (FIG. 2). In a data string (raster data) 601 in which each pixel is represented by 2 bytes, pixel 0, pixel 1, pixel 2, pixel n are arranged in this order from the left side in FIG. 6. Each pixel is separated into higher-end and lower-end, each having one byte (8 bits). That is, bit 15 to 8 of a data string in which each pixel is constituted by 2 bytes is a higher-end byte, and the higher-end data of the respective pixels are represented by P0U, P1U, P2U, PnU; and bit 7 to 0 of a data string in which each pixels is constituted by 2 bytes is a lower-end byte, and the lower-end data of the respective pixels are represented by P0L, P1L, P2L, PnL. The host PC 110 includes a higher-end data generation means, a lower-end data generation means and an encoding means. The higher-end data generation means generates data of higher-end bytes 602 constituted by higher-end data of each pixel from line image data (raster data). Similarly, the lower-end data generation means generates data of lower-end bytes 603 constituted by lower-end data of each pixel from line image data (raster data). The encoding means encodes the data of higher-end bytes 602 and data of lower-end bytes 603. The host PC 110 transfers in order of lines (rasters) the data of higher-end bytes 602 and data of lower-end bytes 603 to the image forming apparatus 120. For example, the host PC transfers the data #N raster, #N+1 raster, #N+2 raster, in that order. Transfer control by the host PC 110 is not limited to the above example. For example, the data of higher-end bytes 602 and data of lower-end bytes 603 may be alternately transferred in a plurality of rasters.

The decoder 310 according to the present embodiment decodes encoded compression-coded data strings and combines the respective decoded data. This processing allows the decoder to obtain the data string 601.

A bus IF input control section 401 is connected via the internal bus and RAM controller 306 to the RAM 307, and performs bus interface control relating to an input transfer of compressed codes and reference data. A bus IF output control section 402 is connected via the internal bus and RAM controller 306 to the RAM 307, and performs bus interface control relating to an output transfer of decoded image data as the decoding result. A decoding section A403 and a decoding section B404 perform, in parallel, decoding processing of compressed codes inputted thereto. A control section 405 monitors each section and controls the whole decoder 310 according to configuration information of a non-illustrated register and the state of each section. The bus IF input control section 401 inputs, for example, data of higher-end bytes of #N raster 602, data of lower-end bytes of #N raster 603, reference data of #N raster, data of higher-end bytes of #N+1 raster 602, data of lower-end bytes of #N+1 raster 603, and reference data of #N+1 raster, in that order. Input control by the bus IF input control section 401 is not limited to the above order. The other order may be employed. For example, the bus IF input control section 401 may input reference data of #N raster, data of higher-end bytes of #N raster 602 and data of lower-end bytes of #N raster 603, in that order.

The decoding section A403 receives compressed code data and reference data from a circuit block at a former stage. The reference data is image data of one raster that is vertically just above the raster to be decoded and was decoded by decoding processing just before this decoding processing. That is, in compression according to the present embodiment, pixels at the same horizontal position are compressed by referring to pixels vertically just above the pixels. Accordingly, also in decoding, pixels vertically just above pixels to be decoded are referred to. With respect to reference data as the first raster, since there is no decoded raster data, a method may be employed in which uncompressed raw data is obtained from the host PC as image data of the first raster. Alternatively, raster data, such as data having all white image data or data having all black image data, may be previously prepared and then used.

A compressed code buffer (A) section 431 is a low-capacity buffer that temporarily stores compressed codes of the decoding section A thereby to smoothen an input flow rate. A reference data buffer (A) section 432 is a low-capacity buffer that temporarily stores reference data of the decoding section A thereby to smoothen an input flow rate. A decoding core (A) 433 provides decoding function in the decoding section A, and performs decoding processing based on compressed codes and reference data and outputs the decoded data. A decoded data buffer (A) section 434 is a low-capacity buffer that temporarily stores the decoded data outputted from the decoding section A thereby to smoothen an output flow rate.

The decoding section B404 has the same configuration as that of the decoding section A403. That is, the decoding section B404 is composed of a compressed code buffer (B) 441, a reference data buffer (B) 442, a decoding core (B) 443 and a decoded data buffer (B) 444.

A compressed code DMAC (A) section 406 performs DMA transfer control relating to compressed code input transfer of the decoding section A403. The compressed code DMAC (A) section 406 reads from the RAM 307 compressed code data obtained by encoding the data string of higher-end bytes of pixels 602. A compressed code DMAC (B) section 407 performs DMA transfer control relating to compressed code input transfer of the decoding section B. The compressed code DMAC (B) section 407 reads from the RAM 307 compressed code data obtained by encoding the data string of lower-end bytes of pixels 603. A reference data DMAC section 408 performs DMA transfer control relating to input transfer of image data 601 of the raster above in which one pixel is constituted by 2 bytes, the image data 601 being necessary for decoding processing in the decoding section A and decoding section B.

A reference data buffer 409 is a low-capacity buffer that serves as a buffer section to temporarily store reference data thereby to effect a smooth data flow. A reference data separation section 410 separates, inputted image data in which each pixel is constituted by 2 bytes, into higher-end data and lower-end data. Of the separated data strings, a data string of higher-end bytes of pixels 602 is transferred to the decoding section A403, and a data string of lower-end bytes of pixels 603 is transferred to the decoding section B404.

By supplying compressed codes and reference data to the decoding section A403 and decoding section B404, the decoding section A403 and decoding section B404 output a decoded data string of higher-end bytes of pixels and a decoded data string of lower-end bytes of pixels, respectively. Then, a decoded data combining section 411 receives the decoded data string of higher-end bytes of pixels outputted from the decoding section A403 and decoded data string of lower-end bytes of pixels outputted from the decoding section B404, and combines both of the data strings to output image data in which each pixel is constituted by 2 bytes. That is, with reference to FIG. 6, a data string of higher-end bytes of pixels 602 and a data string of lower-end bytes of pixels 603 are combined thereby to be restored to image data represented by 601. An output data buffer section 412 is a low-capacity buffer that temporarily stores image data outputted from the decoded data combining section 411 thereby to smoothen an output flow rate. An output data DMAC section 413 performs DMA transfer control relating to restored image data output transfer.

The bus IF input control section 401 receives an input transfer request from the compressed code DMAC(A) 406, an input transfer request from the compressed code DMAC (B) 407, and an input transfer request from the reference data DMAC 408. The bus IF input control section 401 arbitrates the requests in round-robin fashion and thereby select and respond to a transfer requestor and performs transfer processing. Specifically, transfer requests that occur at the same time (compete) are subjected to arbitration so as to be responded in order. Meanwhile, transfer requests that do not compete are not subjected to sequencing control and are immediately responded to, thereby performing transfer processing. In the bus IF output control section 402, since an output transfer request is only from the output data DMAC 413, arbitration is not performed.

The decoder 310 is a hardware that synchronizes with a clock signal to operate. Thick arrows in FIG. 4 that connect respective blocks are data buses having a bus width of 32 bits or 64 bits. Between the respective blocks, a flow control is performed. A Valid signal indicates that data is ready to be transferred to a block at the next stage. An Ack signal indicates to a block at the former stage that the next block is ready for receiving data. Data transfer is actually performed at a clock cycle when the Valid signal and Ack signal both become effective.

In some cases, the compression rate of the compression code of higher-end image data is different from the compression rate of the compression code of lower-end image data. In this case, decoding operations that are performed in parallel in decoding section A403 and decoding section B404 do not process the same amount of data in each clock cycle. Each of the two decoding cores operates in parallel to its own timing according to an inputted compression code, an amount of reference data and timing. In the input stage, since the reference data separation section 410 reads a data string of higher-end bytes of pixels and a data string of lower-end bytes of pixels at the same time, decoding processing of the higher-end and lower-end are synchronized here. If decoding processing in the decoding section A403 advances faster and needs the next reference data but decoding processing by the decoding section B404 has not reached the same pixel as that of the pixel processed by the decoding section A403, the decoding section A403 will wait for decoding processing by the decoding section B404 to catch up with the processing by the decoding section A403. For this reason, each of the decoding section A403 and decoding section B404 may be configured to include two buffers. By employing this configuration, while one of the decoding section A403 and the decoding section B404 is outputting decoded data of #N raster, the other of the decoding section A403 and the decoding section B404 can input encoded data of #N+1 raster.

In the output stage, since the decoded data combining section 411 needs to combine a data string of higher-end bytes of pixels and a data string of lower-end bytes of pixels and output a combined data string at the same time, decoding processing of the higher-end and lower-end are synchronized here. That is, if decoding processing by the decoding section A403 advances faster and can output the next decoded data and decoding processing by the decoding section B404 has not reached the same pixel as that of the pixel processed by the decoding section A403, the decoded data combining section 411 will wait for a decoded data of lower-end bytes of pixels. That is, the decoding section A403 waits for decoding processing by the decoding section B404 to catch up with decoding processing by the decoding section A403. For this reason, the decoded data combining section 411 may be configured to include a buffer to retain not-yet-combined decoded data. By employing this configuration, while one of the decoding section A403 and the decoding section B404 is outputting decoded data of #N raster, the other of the decoding section A403 and the decoding section B404 can input encoded data of #N+1 raster.

Due to reasons such as conflicts between access requests to the RAM controller 306 from other blocks including an image data processing block 311, access requests within the decoder may wait, which changes the data transfer timing. Even if the data transfer timing is changed in this way, the above operations, that is, the flow control by Valid signals and Ack signals as well as the synchronization mechanism working at the input stage and output stage within the decoder allow decoding processing to be performed.

As described above, in the present embodiment, reference data is read from The RAM as unseparated reference data, not separated reference data, the reference data being used in encoding data obtained by separating image data in which each pixel is constituted by 2 bytes into image data of higher-end bytes and image data of lower-end bytes and compressing individually. Then, at a reference data separation section within the decoder, the reference data is separated into reference data (A) and reference data (B), and each of the image data of higher-end bytes and image data of lower-end bytes is decoded. That is, if the reference data is unseparated data, image data in which each pixel is constituted by 16 bits, which is data of one address, is transferred at high speed in the order of addresses when data is read from the RAM. And, compared with individually reading higher-end image data of the reference data and lower-end image data of the reference data from the memory, a memory bandwidth required for reading the reference data can be significantly reduced.

(Second Embodiment)

A second embodiment relates to a decoder that, in addition to functions of the decoder described in the first embodiment, has the function of decoding two rasters in parallel in such a way that two decoding cores are connected in series, an image outputted from one of the decoding cores is directly supplied as an input reference image to the other decoding core.

Figure 7:
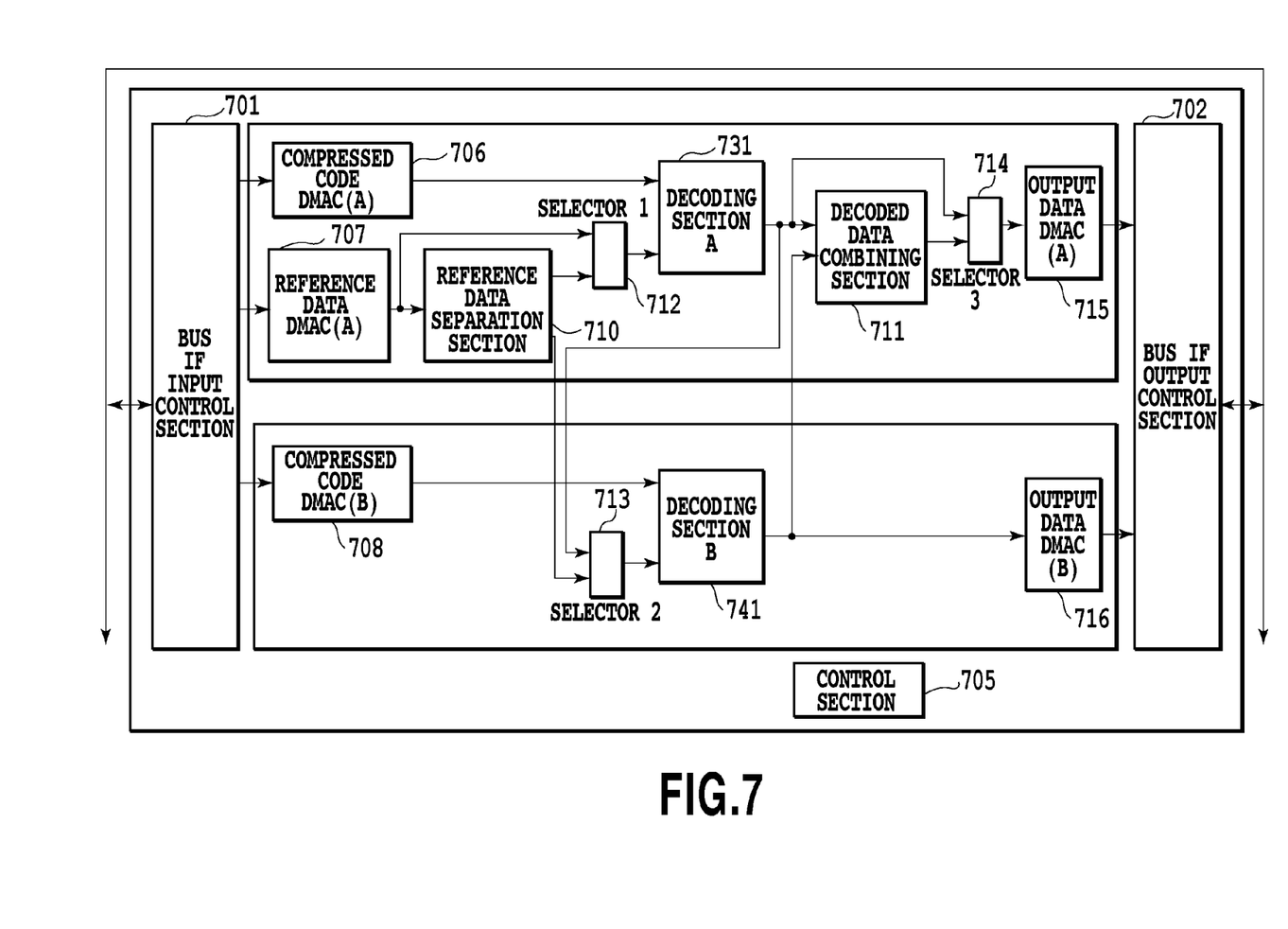
FIG. 7 is a schematic block diagram illustrating a decoder according to a second embodiment.

FIG. 7 is a schematic block diagram illustrating a configuration of the decoder 310 according to the present embodiment. Differences from the decoder of the first embodiment will be mainly described. FIG. 7 has more functional blocks than those of the first embodiment in FIG. 5. Accordingly, to simplify FIG. 7, data buffers between the respective blocks are not illustrated. Similarly, flow control signals (Valid signals, Ack signals) between the respective blocks are not illustrated, either.

Comparing the bus IF input control section 701 and the bus IF output control section 702, the bus IF input control section 701 has the same function as that of the first embodiment whereas the bus IF output control sections 702 receives transfer requests from a plurality of output DMAs, in this example, two output DMACs and arbitrates the requests in round-robin fashion to select and respond to a transfer requestor thereby to perform transfer processing.

The decoding section A731 and the decoding section B741 have the same functions of the decoding sections A403 and B404 according to the first embodiment, but in the present embodiment, it is necessary that the two decoding sections support the same encoding method.

The present embodiment is characterized in that added selector 1, selector 2 and selector 3 are used to switch a data path, in particular, supporting a high-speed operation mode in which output from the decoding section A731 is inputted as reference data through the selector 2 into the decoding section B741. By changing the configuration of the selectors to be operated, the present embodiment can support decoding of the data format in which each pixel is constituted by 2 bytes in the first embodiment. Further, the control section 705 can properly configure and control functional blocks that outnumber and are more complicated than the blocks of the first embodiment.

Figure 8A:
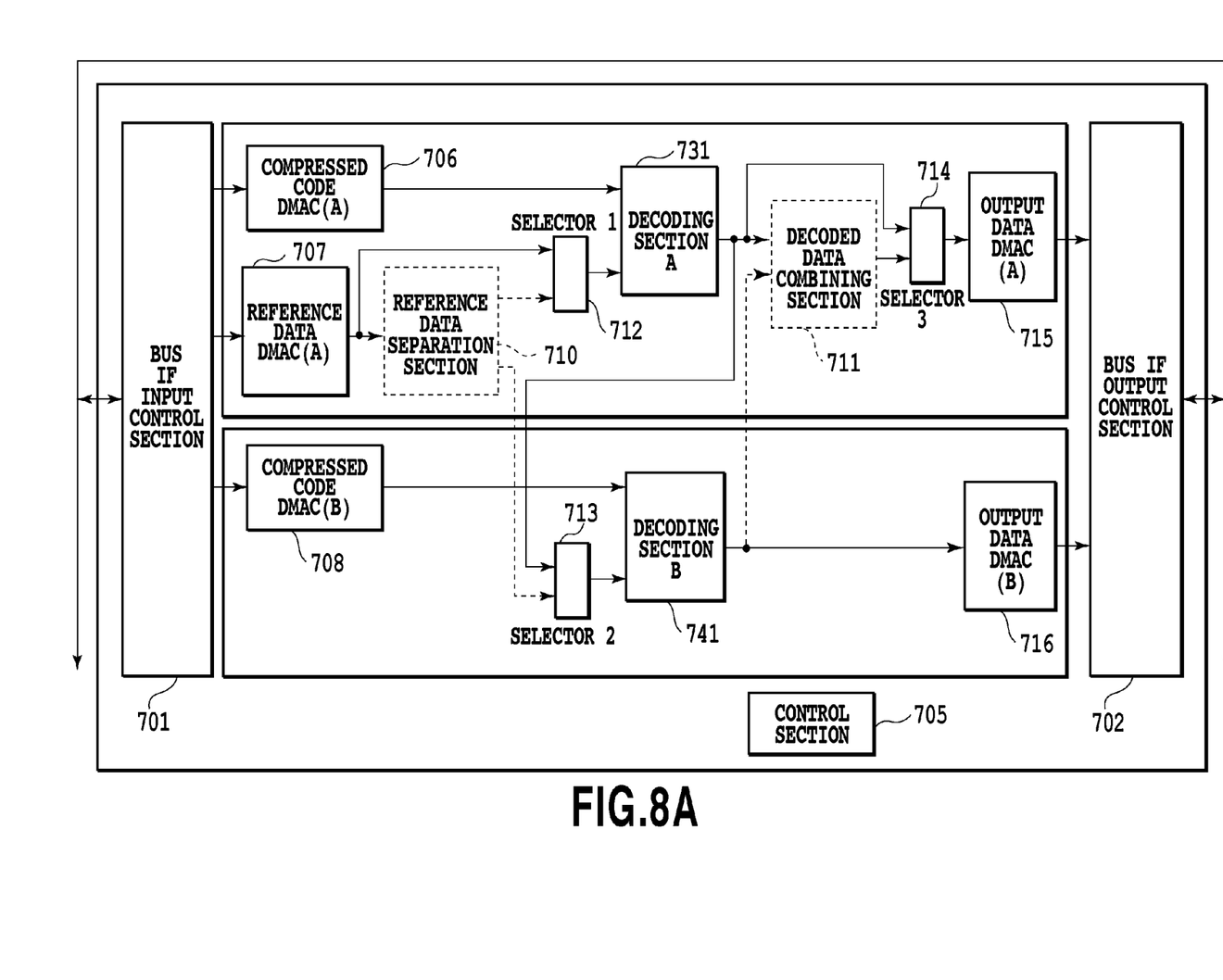
FIGS. 8A and 8B are schematic block diagrams illustrating a decoder according to the second embodiment.
Figure 8B:
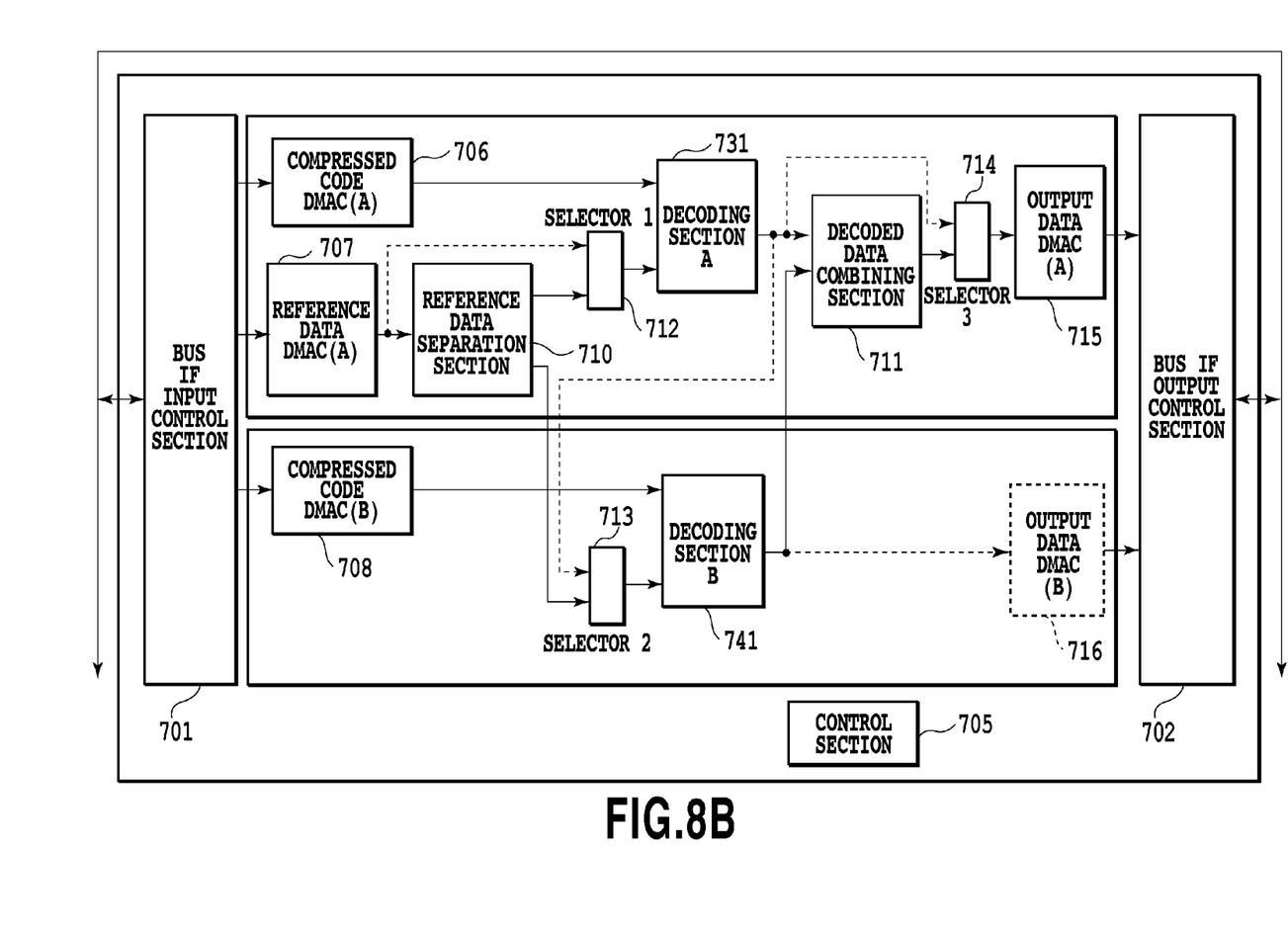

FIG. 8A illustrates a data path at the high speed operation mode according to the present embodiment, and FIG. 8B illustrates a data path at a high picture-quality operation mode according to the first embodiment that deals with pixel data in which each pixel is constituted by 2 bytes. In these Figs, data paths and functional blocks indicated by dash lines are not selected, and data paths indicated by full lines are effective and operative.

That is, in FIG. 8A, to the decoding section A731, compressed codes are supplied from the compressed code DMAC(A) and reference data read from the reference data DMAC(A) is supplied through the selector 1. Data outputted from the decoding section A is inputted as reference data of the decoding section B741 through the selector 2. Data outputted from the decoding section A731 is inputted through the selector 3 to an output data DMAC(A).

Next, linking and parallel operation of the decoding section A731 and the decoding section B741, which are characteristics of the present embodiment, will be described.

The decoding section A731 and decoding section B741 are used to perform parallel decoding processing of successive 2 rasters (#(N+1) and #(N+2)). To the decoding section A731, a compressed code corresponding to the raster #(N+1) and a reference raster #N are inputted from the RAM 307 that is an external memory. Decoded raster #(N+1) is outputted to the RAM 307 and also supplied as a reference raster #(N+1) to the decoding section B741. The decoding section A731 and the decoding section B741 are linked in series and between them a non-illustrated low-capacity buffer is provided to temporarily store the reference raster #(N+1). The above reference raster #(N+1), as well as a compressed code corresponding to the raster #(N+2), are inputted from the RAM 307 that is an external memory to the decoding section B741, which outputs the restored raster #(N+2) to the RAM 307.

The decoding section A731 operates only when a non-illustrated reference data buffer (A) section therein has the necessary amount of reference data and a non-illustrated compressed code buffer (A) section has the necessary amount of compressed codes. In addition, a condition for operation of the decoding section A731 is that the non-illustrated output data buffer (A) section has the free space necessary to store output data.

Similarly, the decoding section B741 operates only when the non-illustrated reference data buffer (B) section has the necessary amount of reference data and the non-illustrated compressed code buffer (B) section has the necessary amount of compressed codes. In addition, a condition for operation of the decoding section A731 is that the non-illustrated output data buffer (B) section has the free space necessary to store output data.

The respective buffers are configured to sufficiently smoothen an hourly flow rate in input or output transfer, and specifically, has the capacity of a double buffer configuration for the data transfer unit to and from the RAM 307. The capacity is, in a four-beat transfer through a 64-bit data bus, 512 bits corresponding to 64 bits×8 stages.

In decoding processing, in the case where an upper reference line is stored in an on-chip buffer, a memory capacity of no less than 3.3M bits is required to correspond to 16 bits for each of RGB, a resolution of 1200 dpi and a maximum printing width of 60 inches. The above configuration, without configuring a high capacity of on-chip reference raster memory, can reduce the number of accesses to reference rasters the RAM 307 that is an external memory for processing to decode successive two rasters, to the number of accesses for one raster (that is, reduce by half). At the same time, parallelization of decoding processing realizes a high-speed data processing.

With the use of the configuration according to the present embodiment, by selecting a data path in FIG. 8A and having necessary functional blocks operate, two decoding cores are linked in series and thereby a decoded image outputted from one of the decoding cores is supplied as an input reference image directly to the other decoding core. This, without configuring an on-chip reference data memory per line, can effectively reduce data input/output to and from an external memory (request bandwidth), thereby realizing a high-speed performance and a lower cost.

In FIG. 8B, the selector 1, selector 2 and selector 3 select the other input ends and output to the next stages.

Reference data read from the reference data DMAC(A) is separated in a reference data separation section 710 and a data string of higher-end bytes of pixels is supplied through the selector 1 to the decoding section A731. Data outputted from the decoding section A731 is outputted to a decoded data combining section 711. A data string of lower-end bytes of pixels that is separated in the reference data separation section 710 is inputted as a reference data through the selector 2 to the decoding section B741. Data outputted from the decoding section A731 and data outputted from the decoding section B741 are inputted to the decoded data combining section 711, and an output from the decoded data combining section 711 is inputted through the selector 3 to the output data DMAC(A) 715. During this operation mode, the output data DMAC(B) 716 is not in operation.

By an instruction from the control section 705, the above data path is selected and the respective functional blocks operate, thereby realizing decoding operation according to the first embodiment.

As described above, by using an identical decoding core for two decoding cores and adding a mechanism of switching the data path according to an operation mode, the number of accesses to the reference data memory can be effectively reduced in both of the high picture-quality and high-speed operation modes. In the present embodiment, functional blocks added to the functional blocks in the first embodiment are three data path selectors and one output data DMAC, and with this, a small-size circuit such as an arbitrating mechanism is added to the bus IF output section, which can be realized with low cost. That is, a high-picture quality and a high-speed processing can be realized with low cost.

(Third Embodiment)

In the above embodiments, a method in which the previous (just above) one raster is referred to in decoding processing has been described. However, the present invention can be applied to a method of referring to a plurality of rasters above or a method that uses a processed raster reference in addition to the above method.

As multiple-tone pixel data, pixel data in which each pixel is represented by 2 bytes and pixel data in which each pixel is represented by 12 bits were exemplified, but by increasing the number of the decoding core and its accompanying circuit block as a set, pixel data with more tones may be dealt with. If the number of the sets is increased, the number of rasters to be processed in parallel can be increased from two raster parallel processing in the above embodiments.

Although an image to be scanned horizontally was exemplified, the present invention can be applied to a case in which pixels are sequentially processed vertically (columnwise). In such a case, in addition to the column to be processed, the previous one or more column(s) is/are referred to.

In the above embodiments, an example has been described in which an image decoding device is applied to an image forming system that employs an inkjet method to represent an image by only two tones. However, the present invention does not depend on an image forming method. The present invention can be applied to an inkjet method to represent an image by several tones, and also can be applied to other methods including an electrophotographic method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-087151, filed Apr. 11, 2011, which is hereby incorporated by reference herein in its entirety.

What is claimed is:

1. A data decoding device comprising:
   at least one memory storing a program; and
   a CPU, operating under control of the program, to perform:
   a first decoding step,
   a second decoding step,
   a combining step, a first selecting step,
a second selecting step, and
a reference data separation step, wherein
in a case where a high speed operation mode is selected, the first selecting step controls a path so that reference data is transmitted to a first decoding unit that performs the first decoding step without separation by the reference data separation step, the first decoding step performs decoding processing based on compressed data of a first line and reference data for the first line and outputs first decoded data obtained by decoding the compressed data of the first line for a memory and the second decoding step that is performed by a second decoding unit, the second selecting step controls a path between the first and the second decoding units so that decoded data outputted from the first decoding unit is transmitted to the second decoding unit, and the second decoding step performs decoding processing based on compressed data of a second line next to the first line and the first decoded data and outputs second decoded data obtained by decoding the compressed data of the second line for a memory, wherein the decoding processing by the first decoding step and the decoding processing by the second decoding step are performed in parallel, and in a case where a high picture-quality operation mode is selected, the first selecting step controls a path so that reference data is transmitted to the first decoding unit through separation by the reference data separation step, the reference data separation step separates reference data into higher-end reference data and lower-end reference data, the first decoding step performs decoding processing based on higher-end compressed data of pixels included in an object line and the higher-end reference data and outputs third decoded data obtained by decoding the higher-end compressed data for the combining step, the second selecting step controls the path between the first and the second decoding units so that decoded data outputted from the first decoding unit is not transmitted to the second decoding unit, the second decoding step performs decoding processing based on lower-end compressed data of pixels included in the object line and the lower-end reference data and outputs fourth decoded data obtained by decoding the lower-end compressed data for the combining step, and the combining step generates decoded data of the object line based on the third decoded data and the fourth decoded data.

2. The data decoding device according to claim 1, wherein the first decoding unit has the same configuration as that of the second decoding unit.

3. The data decoding device according to claim 1, wherein the higher-end compressed data is generated based on a bit 15 to 8 of a data string in which a pixel is constituted by 2 bytes, and the lower-end compressed data is generated based on bit 7 to 0 of a data string in which a pixel is constituted by 2 bytes.

4. The data decoding device according to claim 1, wherein the CPU also operates under control of the program to implement a reference data selector, and
in a case where the high speed operation mode is selected, the first decoding unit is connected to a reference data Direct Memory Access Control (DMAC) by the reference data selector, and in a case where the high picture-quality operation mode is selected, the first decoding unit is connected to a reference data separation unit that performs the reference data separation step by the reference data selector.

5. The data decoding device according to claim 1, further comprising a printing unit.

6. The data decoding device according to claim 1, wherein the first decoding unit performs decoding processing in each of the high speed operation and the high picture-quality operation modes.

7. The data decoding device according to claim 1, wherein the CPU also operates under control of the program to implement a selector,
in a case where the high speed operation mode is selected, the selector obtains first decoded data outputted from the first decoding unit without combination by the combining step, and
in a case where the high picture-quality operation mode is selected, the selector obtains data outputted from the combining step.

8. A data decoding method comprising:
a first decoding step;
a second decoding step;
a combining step;
a first selecting step;
a second selecting step; and
a reference data separation step, wherein
in a case where a high speed operation mode is selected, the first selecting step controls a path so that reference data is transmitted to a first decoder that performs the first decoding step without separation by the reference data separation step, the first decoding step performs decoding processing based on compressed data of a first line and reference data for the first line and outputs first decoded data obtained by decoding the compressed data of the first line for a memory and the second decoding step that is performed by a second decoder, the second selecting step controls a path between the first and the second decoders so that decoded data outputted from the first decoder is transmitted to the second decoder, and the second decoding step performs decoding processing based on compressed data of a second line next to the first line and the first decoded data and outputs second decoded data obtained by decoding the compressed data of the second line for a memory, wherein the decoding processing by the first decoding step and the decoding processing by the second decoding step are performed in parallel, and
in a case where a high picture-quality operation mode is selected, the first selecting step controls a path so that reference data is transmitted to the first decoder through separation by the reference data separation step, the reference data separation step separates reference data into higher-end reference data and lower-end reference data, the first decoding step performs decoding processing based on higher-end compressed data of pixels included in an object line and the higher-end reference data and outputs third decoded data obtained by decoding the higher-end compressed data for the combining step, the second selecting step controls the path between the first and the second decoders so that decoded data outputted from the first decoder is not transmitted to the second decoder, the second decoding step performs decoding processing based on lower-end compressed data of pixels included in the object line and the lower-end reference data and outputs fourth decoded data obtained by decoding the lower-end compressed data for the combining step, and the combining step generates decoded data of the object line based on the third decoded data and the fourth decoded data.

9. The data decoding method according to claim 8, wherein the first decoding step has the same configuration as that of the second decoding step.

10. The data decoding method according to claim 8, wherein the higher-end compressed data is generated based on a bit 15 to 8 of a data string in which a pixel is constituted by 2 bytes, and the lower-end compressed data is generated based on bit 7 to 0 of a data string in which a pixel is constituted by 2 bytes.

11. The data decoding method according to claim 8, wherein in a case where a high speed operation mode is selected, the first decoder is connected to a reference data Direct Memory Access Control (DMAC) by a reference data selector that performs a reference data selecting step, and
in a case where the high picture-quality operation mode is selected, the first decoder is connected to a reference data separation unit that performs the reference data separation step by the reference data selector.

12. The data decoding method according to claim 8, further comprising performing a printing step.

13. The data decoding method according to claim 8, wherein the first decoder performs decoding processing in each of the high speed operation and the high picture-quality operation modes.

14. The data decoding method according to claim 8, further comprising a third selecting step, wherein
in a case where the high speed operation mode is selected, the third selecting step obtains first decoded data outputted from the first decoder without combination by the combining step, and
in a case where the high picture-quality operation mode is selected, the third selecting step obtains data outputted by the combining step.

15. A non-transitory computer readable storage medium storing a program for causing a computer to perform the data decoding method according to claim 8.

* * * * *